(12) United States Patent
Toscano et al.

(10) Patent No.: US 7,168,400 B1
(45) Date of Patent: Jan. 30, 2007

(54) COOLING SYSTEM FOR INTERNAL COMBUSTION ENGINE

(76) Inventors: Jamie L. Toscano, P.O. Box 2260, Branchville, NJ (US) 07826; Travis C. Trilling, 2 Martha St., Branchville, NJ (US) 07826

( * ) Notice: Subject to any disclaimer, the term of this patent is extended or adjusted under 35 U.S.C. 154(b) by 446 days.

(21) Appl. No.: 10/828,858

(22) Filed: Apr. 21, 2004

(51) Int. Cl.
*F01P 3/22* (2006.01)
*F25B 27/00* (2006.01)

(52) U.S. Cl. ............................ 123/41.19; 62/323.1
(58) Field of Classification Search .. 123/41.19–41.24; 62/239, 323.1
See application file for complete search history.

(56) References Cited

U.S. PATENT DOCUMENTS

| 1,949,812 | A | * | 3/1934 | Read ..................... 123/41.19 |
| 2,776,648 | A | | 1/1957 | Taylor, Jr. |
| 3,070,975 | A | | 1/1963 | Cornelius |
| 3,181,308 | A | * | 5/1965 | Vander Hagen ......... 123/41.19 |
| 4,776,181 | A | | 10/1988 | Maule |
| 6,173,578 | B1 | * | 1/2001 | Al-Otaibi ................ 123/41.19 |

* cited by examiner

*Primary Examiner*—Noah P. Kamen

(57) ABSTRACT

A cooling system for enhanced variable cooling of internal combustion engine having a multi-speed water pump connected to an internal combustion engine for pumping conventional refrigerant. A radiator is connected to the multi-speed water pump and is in fluid communication with the multi-speed water pump. A first electronic expansion valve is connected to the radiator and is in fluid communication with the radiator. The electronic expansion valve is for metering the conventional refrigerant. A fresh air intake cooler is connected to the first electronic expansion valve and is in fluid communication with the first electronic expansion valve.

20 Claims, 3 Drawing Sheets

COOLING SYSTEM FOR INTERNAL COMBUSTION ENGINE

BACKGROUND OF THE INVENTION

1. Field of the Invention

The present invention relates to a cooling system for internal combustion engine for use in connection with heat exchangers. The cooling system for internal combustion engine has particular utility in connection with cooling systems for internal combustion engines that utilize a refrigerant compressor and evaporator.

2. Description of the Prior Art

Cooling system for internal combustion engines are desirable for reducing the thermal load of engines and allowing them to operate with greater efficiency and lubrication lifetime.

The use of heat exchangers is known in the prior art. For example, U.S. Pat. No. 4,776,181 to Maule discloses a evaporative heat exchanger that has recirculating coolant from an engine passes through tubes in a heat exchanger pressure vessel. A cooling medium is directed onto the exterior surfaces of the tubes, and the pressure within the vessel is reduced to lower the temperature of evaporation of the cooling medium. A thermostatic control reduces or prevents the flow of engine coolant to the tubes when the coolant temperature falls below the temperature of evaporation of the cooling medium. However, the Maule '181 patent does not remove engine thermal energy by the use of a compressor driven refrigeration unit having an electronic expansion valve to meter the unit.

Similarly, U.S. Pat. No. 3,070,975 to Cornelius discloses a structure for cooling water heated in cooling automobile engine that has a water cooled engine manifold block, a radiator for cooling the water heated in cooling the engine manifold block, and a water pump to pick up the cooled water for the radiator for recirculation to the engine manifold block. The combination of an automobile air conditioning system comprising in the engine compartment successively in line a refrigerant compressor to deliver refrigerant therefrom as a hot pressurized gas. A condenser in which to cool and liquefy the refrigerant, a dryer to absorb any moisture from the refrigerant, an expansion valve through which the refrigerant may be needled to relieve the pressure thereon. An evaporator in the passenger compartment to pick up heat therefrom to evaporate part of the refrigerant into a gas, a return refrigerant conduit into the engine compartment with one end connected to the evaporator. The engine compartment also having a return refrigerant conduit separate therefrom for delivery of return refrigerant through an end thereof connected to the compressor. A hot water return conduit with one end connected to the engine manifold block, a hot water return conduit separate therefrom for delivery of hot water through an end thereof into the radiator. A heat exchanger spaced from the engine an a heat exchanger coil passing sealably therethrough with one of the heat exchanger and the heat exchanger coil having its opposite ends connected to the other ends of the hot water return conduit. The other of the heat exchanger and the heat exchanger coils having its opposite ends connected to the other ends of the return refrigerant conduits whereby the hot water is cooled in passage to the radiator. The return refrigerant is evaporated to pass in gaseous state into the compressor. However, the Cornelius '975 patent does not remove engine thermal energy by the use of a compressor driven refrigeration unit having an electronic expansion valve to meter the unit.

Lastly, U.S. Pat. No. 2,776,648 to Taylor, Jr. discloses an engine cooling process which comprises circulating water through an engine, passing the resulting heated fluid in heat exchange relation with a liquid refrigerant having a freezing point below the freezing point of water and a boiling point below the boiling point of water. Transferring heat from the fluid to the refrigerant, returning the exit water formed from the fluid to the engine and circulating the heated refrigerant through an air cooled condenser. However, the Taylor, Jr. '648 patent does not remove engine thermal energy by the use of a compressor driven refrigeration unit having an electronic expansion valve to meter the unit.

While the above-described devices fulfill their respective, particular objectives and requirements, the aforementioned patents do not describe a cooling system for internal combustion engine that allows cooling systems for internal combustion engines that utilize a refrigerant compressor and evaporator. The Maule' 181, Cornelius '975 and Taylor, Jr. '648 patents make no provision for removal of engine thermal energy by the use of a compressor driven refrigeration unit having an electronic expansion valve to meter the unit.

Therefore, a need exists for a new and improved cooling system for internal combustion engine which can be used for cooling systems for internal combustion engines that utilize a refrigerant compressor and evaporator. In this regard, the present invention substantially fulfills this need.

In this respect, the cooling system for internal combustion engine according to the present invention substantially departs from the conventional concepts and designs of the prior art, and in doing so provides an apparatus primarily developed for the purpose of cooling systems for internal combustion engines that utilize a refrigerant compressor and evaporator.

SUMMARY OF THE INVENTION

In view of the foregoing disadvantages inherent in the known types of heat exchangers now present in the prior art, the present invention provides an improved cooling system for internal combustion engine, and overcomes the above-mentioned disadvantages and drawbacks of the prior art. As such, the general purpose of the present invention, which will be described subsequently in greater detail, is to provide a new and improved cooling system for internal combustion engine and method which has all the advantages of the prior art mentioned heretofore and many novel features that result in a cooling system for internal combustion engine which is not anticipated, rendered obvious, suggested, or even implied by the prior art, either alone or in any combination thereof.

To attain this, the present invention essentially comprises a multi-speed water pump connected to an internal combustion engine for pumping conventional refrigerant. A radiator is connected to the multi-speed water pump and is in fluid communication with the multi-speed water pump. A first electronic expansion valve is connected to the radiator and is in fluid communication with the radiator. The electronic expansion valve is for metering the conventional refrigerant. A fresh air intake cooler is connected to the first electronic expansion valve and is in fluid communication with the first electronic expansion valve.

There has thus been outlined, rather broadly, the more important features of the invention in order that the detailed description thereof that follows may be better understood and in order that the present contribution to the art may be better appreciated.

The invention may also include a first check valve, a second check valve, a filter drier, a heat exchanger, an accumulator, a variable speed compressor, a liquid receiver, a headmaster thermostat valve, a condenser, a water pump temperature sensor, a water engine temperature sensor, a fresh air intake temperature sensor, a compressor load sensor, a condenser temperature sensor, a control module, a condenser fan and a main power module. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cooling system for internal combustion engine that has all of the advantages of the prior art heat exchangers and none of the disadvantages.

It is another object of the present invention to provide a new and improved cooling system for internal combustion engine that may be easily and efficiently manufactured and marketed.

An even further object of the present invention is to provide a new and improved cooling system for internal combustion engine that has a low cost of manufacture with regard to both materials and labor, and which accordingly is then susceptible of low prices of sale to the consuming public, thereby making such cooling system for internal combustion engine economically available to the buying public.

Still another object of the present invention is to provide a new cooling system for internal combustion engine that provides in the apparatuses and methods of the prior art some of the advantages thereof, while simultaneously overcoming some of the disadvantages normally associated therewith.

Lastly, it is an object of the present invention is to provide a cooling system for internal combustion engine for cooling systems for internal combustion engines that utilize a refrigerant compressor and evaporator.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
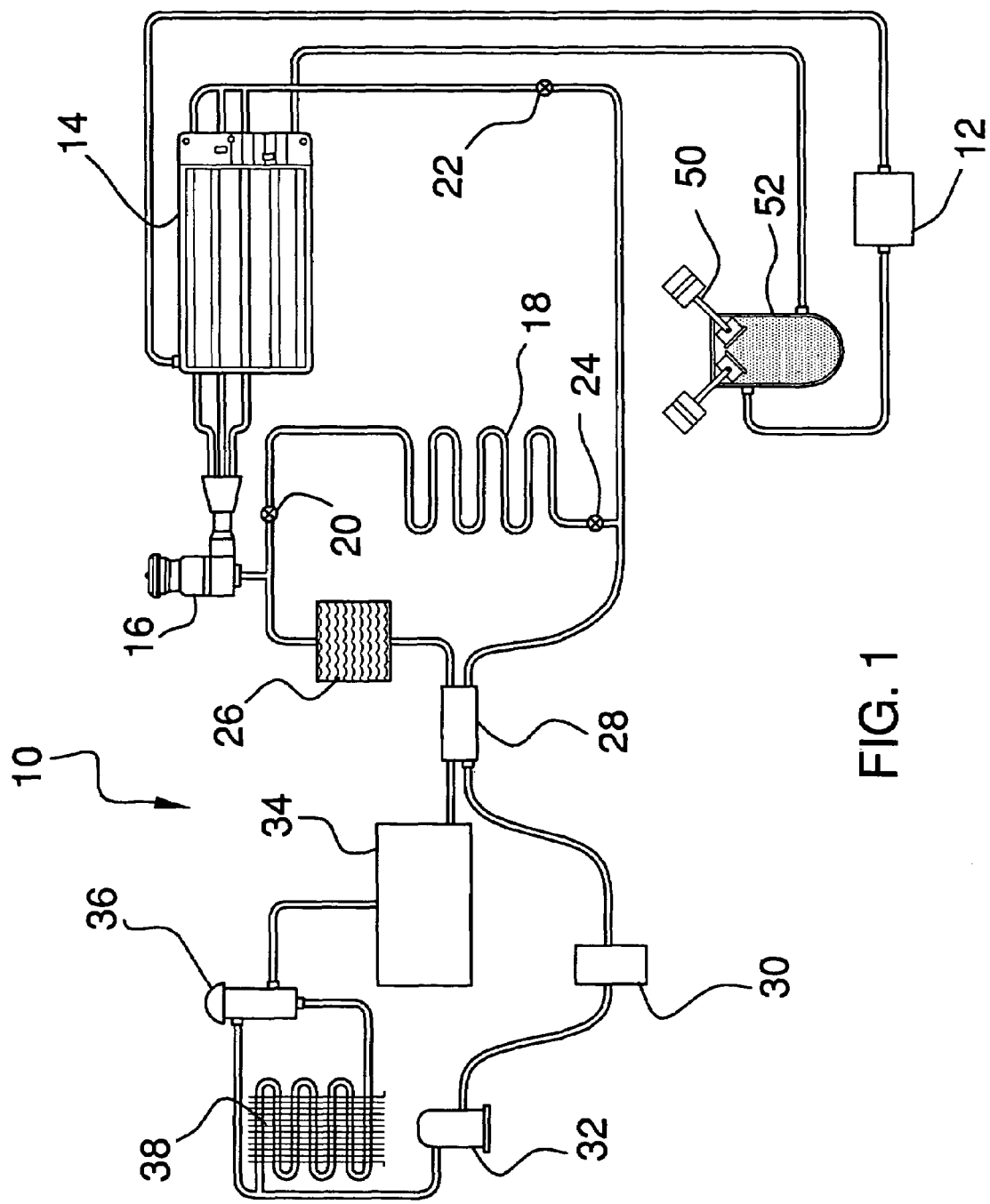
FIG. 1 is a piping diagram view of the preferred embodiment of the cooling system for internal combustion engine constructed in accordance with the principles of the present invention.
Figure 2:
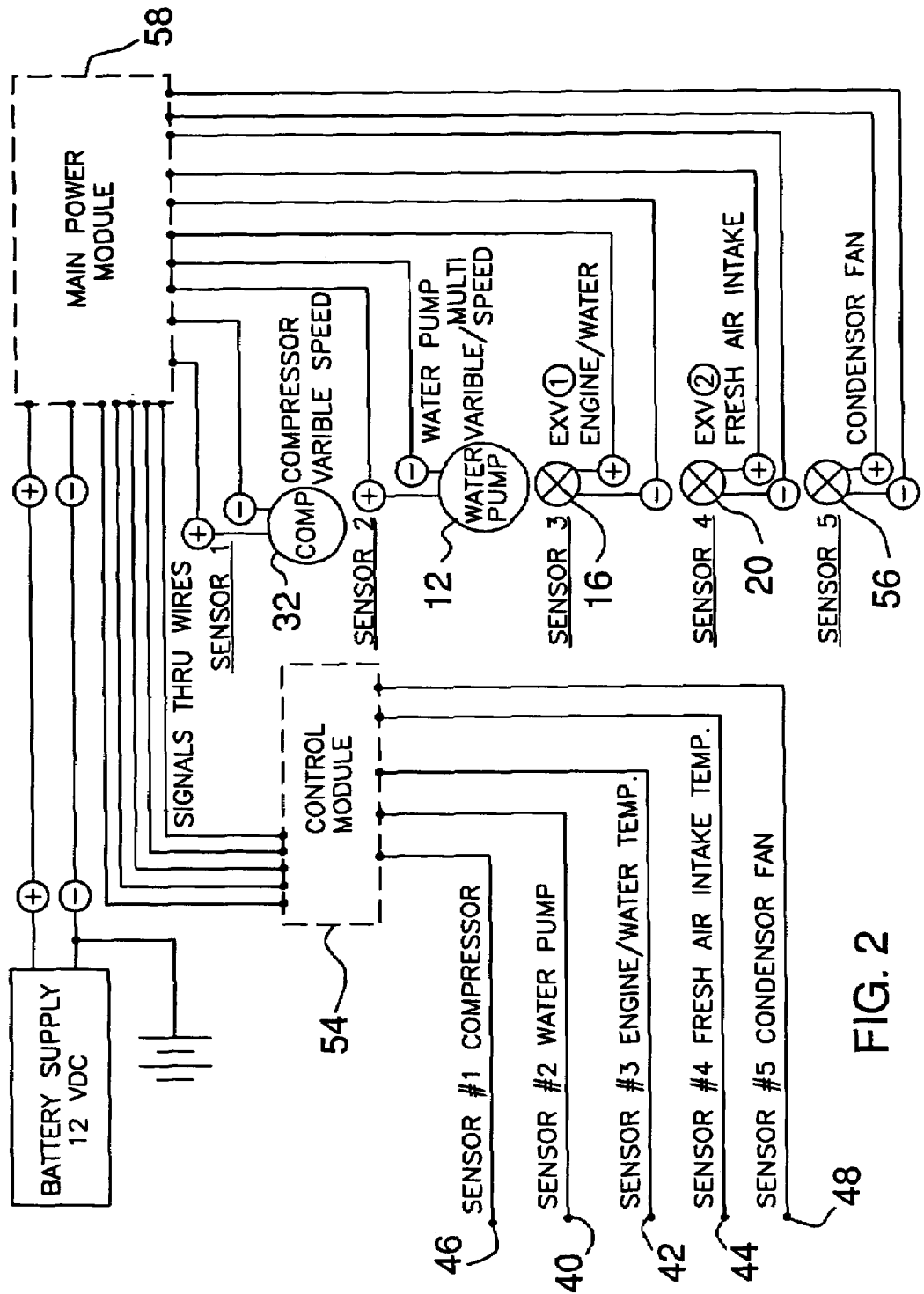
FIG. 2 is a wiring diagram view of the cooling system for internal combustion engine of the present invention.
Figure 3:
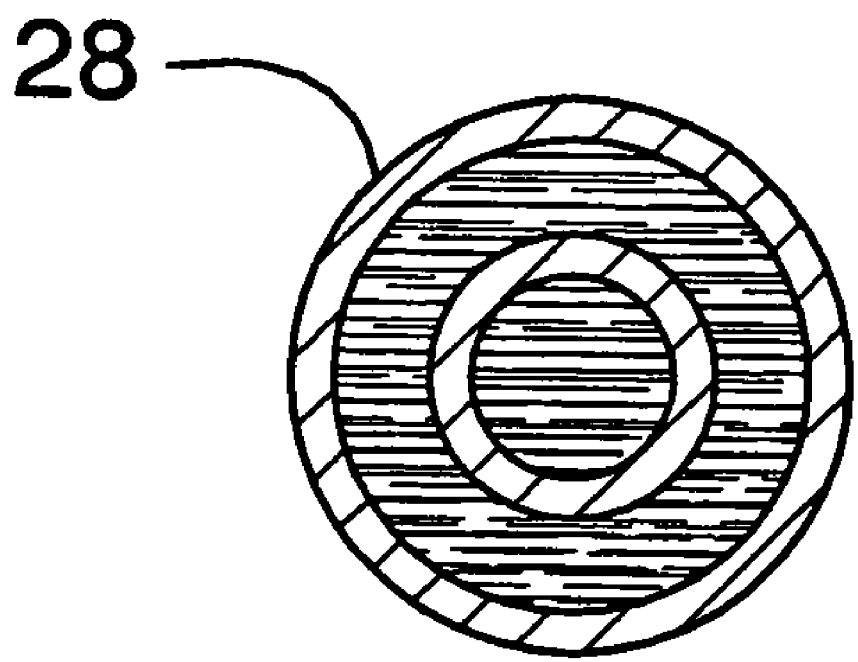
FIG. 3 is a section view of the cooling system for internal combustion engine of the present invention.

Referring now to the drawings, and particularly to FIGS. 1–3, a preferred embodiment of the cooling system for internal combustion engine of the present invention is shown and generally designated by the reference numeral 10.

In FIG. 1, a new and improved cooling system for internal combustion engine 10 of the present invention for cooling systems for internal combustion engines that utilize a refrigerant compressor and evaporator is illustrated and will be described. More particularly, the cooling system for internal combustion engine 10 has a multi-speed water pump 12 is connected to an internal combustion engine 50. The multi-speed water pump 12 is in fluid communication with the conventional internal combustion engine 50. The multi-speed water pump 12 is for pumping a conventional refrigerant. A radiator 14 is connected to the multi-speed water pump 12. The radiator 14 is in fluid communication with the multi-speed water pump 12. A first electronic expansion valve 16 is connected to the radiator 14. The electronic expansion valve is in fluid communication with the radiator 14. The electronic expansion valve is for metering a conventional refrigerant 52. A fresh air intake cooler 18 is connected to the first electronic expansion valve 16. The fresh air intake cooler 18 is in fluid communication with the first electronic expansion valve 16. A second electronic expansion valve 20 is connected to the first electronic expansion valve 16. The second electronic expansion valve 20 is in fluid communication with the fresh air intake cooler 18 for providing selective metering of the conventional refrigerant 52 for cooling in the fresh air intake cooler 18. A first check valve 22 is connected to the radiator 14. The first check valve 22 is in fluid communication with the radiator 14. A second check valve 24 is connected to the fresh air intake cooler 18. The second check valve 24 is in fluid communication with the fresh air intake cooler 18. The second check valve 24 is connected to the first check valve 22. The second check valve 24 is in fluid communication with the first check valve 22. A filter drier 26 is connected to the first electronic expansion valve 16. The filter drier 26 is in fluid communication with the first electronic expansion valve 16. A heat exchanger 28 is connected to the filter drier 26. The heat exchanger 28 is in fluid communication with the filter drier 26. The heat exchanger 28 is connected to the second check valve 24. The heat exchanger 28 is in fluid communication with the second check valve 24. An accumulator 30 is connected to the heat exchanger 28. The accumulator 30 is in fluid communication with the heat exchanger 28. A variable speed compressor 32 is connected to the accumulator 30. The variable speed compressor 32 is in fluid communication with the accumulator 30. A liquid receiver 34 is connected to the heat exchanger 28. The liquid receiver 34 is in fluid communication with the heat exchanger 28. A headmaster thermostat valve 36 is connected to the liquid receiver 34. The headmaster thermostat valve 36 is in fluid communication with the liquid receiver 34. The headmaster thermostat valve 36 for selectively metering the conventional refrigerant 52. A condenser 38 is connected to the headmaster thermostat valve 36. The condenser 38 is in fluid communication with the headmaster thermostat valve 36. The condenser 38 is connected to the variable speed compressor 32. The condenser 38 is in fluid communication with the variable speed compressor 32. A water pump temperature sensor 40 is connected to the multi-speed water pump 12. The cooling system for internal combustion engine 10 is especially useful in marine applications where normally cooled engines use lake water or sea water to cool the engine, the instant invention isolates the cooling water from the lake water or sea water to avoid contamination.

In FIG. 2, the cooling system for internal combustion engine 10 is illustrated and will be described. More particularly, the cooling system for internal combustion engine 10 has an engine water temperature sensor 42 connected to the internal combustion engine 50. A fresh air intake temperature sensor 44 is connected to the fresh air intake cooler 18. A compressor load sensor 46 is connected to the variable speed compressor 32. A condenser temperature sensor 48 is connected to the condenser 38. A condenser fan 56 is in pneumatic communication with the condenser 38. A control module 54 is electrically connected to the water pump temperature sensor 40. The control module 54 is electrically connected to the engine water temperature sensor 42. The control module 54 is electrically connected to the fresh air intake temperature sensor 44. The control module 54 is electrically connected to the compressor load sensor 46. The control module 54 is electrically connected to the condenser temperature sensor 48. A main power module 58 is electrically connected to the control module 54. The main power module 58 is electrically connected to the multi-speed water pump 12. The main power module 58 is electrically connected to the first electronic expansion valve 16. The main power module 58 is electrically connected to the second electronic expansion valve 20. The main power module 58 is electrically connected to the variable speed compressor 32. The main power module 58 is electrically connected to the condenser fan 56.

In FIG. 3, the cooling system for internal combustion engine 10 is illustrated and will be described. More particularly, the cooling system for internal combustion engine 10 has the heat exchanger 28 cross section shown.

While a preferred embodiment of the cooling system for internal combustion engine has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as composite or plastic may be used instead of the metal compressor described. And although cooling systems for internal combustion engines that utilize a refrigerant compressor and evaporator have been described, it should be appreciated that the cooling system for internal combustion engine herein described is also suitable for cooling aircraft engines, marine engines and industrial type engines.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cooling system for internal combustion engine comprising:
    a multi-speed water pump connected to an internal combustion engine, said multi-speed water pump in fluid communication with said conventional internal combustion engine, said multi-speed water pump for pumping conventional refrigerant;
    a radiator connected to said multi-speed water pump, said radiator in fluid communication with said multi-speed water pump;
    a first electronic expansion valve connected to said radiator, said electronic expansion valve in fluid communication with said radiator, said electronic expansion valve for metering said conventional refrigerant; and
    a fresh air intake cooler connected to said first electronic expansion valve, said fresh air intake cooler in fluid communication with said first electronic expansion valve.

2. The cooling system for internal combustion engine of claim 1 further comprising:
    a second electronic expansion valve connected to said first electronic expansion valve, said second electronic expansion valve in fluid communication with said fresh air intake cooler for providing selective metering of said conventional refrigerant for cooling in said fresh air intake cooler.

3. The cooling system for internal combustion engine of claim 1 further comprising:
    a first check valve connected to said radiator; said first check valve in fluid communication with said radiator; and
    a second check valve connected to said fresh air intake cooler, said second check valve in fluid communication with said fresh air intake cooler, said second check valve connected to said first check valve, said second check valve in fluid communication with said first check valve.

4. The cooling system for internal combustion engine of claim 3 further comprising:
    a filter drier connected to said first electronic expansion valve, said filter drier in fluid communication with said first electronic expansion valve.

5. The cooling system for internal combustion engine of claim 4 further comprising:
    a heat exchanger connected to said filter drier, said heat exchanger in fluid communication with said filter drier, said heat exchanger connected to said second check valve, said heat exchanger in fluid communication with said second check valve.

6. The cooling system for internal combustion engine of claim 5 further comprising:
   an accumulator connected to said heat exchanger, said accumulator in fluid communication with said heat exchanger.

7. The cooling system for internal combustion engine of claim 6 further comprising:
   a variable speed compressor connected to said accumulator, said variable speed compressor in fluid communication with said accumulator.

8. The cooling system for internal combustion engine of claim 7 further comprising:
   a compressor load sensor connected to said variable speed compressor.

9. The cooling system for internal combustion engine of claim 7 further comprising:
   a liquid receiver connected to said heat exchanger, said liquid receiver in fluid communication with said heat exchanger.

10. The cooling system for internal combustion engine of claim 9 further comprising:
    a headmaster thermostat valve connected to said liquid receiver, said headmaster thermostat valve in fluid communication with said liquid receiver, said headmaster thermostat valve for selectively metering said conventional refrigerant.

11. The cooling system for internal combustion engine of claim 10 further comprising:
    a condenser connected to said headmaster thermostat valve, said condenser in fluid communication with said headmaster thermostat valve, said condenser connected to said variable speed compressor, said condenser in fluid communication with said variable speed compressor.

12. The cooling system for internal combustion engine of claim 11 further comprising:
    a condenser temperature sensor connected to said condenser.

13. The cooling system for internal combustion engine of claim 1 further comprising:
    a water pump temperature sensor connected to said multi-speed water pump;
    an engine water temperature sensor connected to said internal combustion engine;
    a fresh air intake temperature sensor connected to said fresh air intake cooler; and
    a control module electrically connected to said water pump temperature sensor, said control module electrically connected to said engine water temperature sensor, said control module electrically connected to said fresh air intake temperature sensor.

14. The cooling system for internal combustion engine of claim 1 further comprising:
    a water pump temperature sensor connected to said multi-speed water pump;
    an engine water temperature sensor connected to said internal combustion engine;
    a fresh air intake temperature sensor connected to said fresh air intake cooler;
    a compressor load sensor connected to said variable speed compressor;
    a condenser temperature sensor connected to said condenser; and
    a control module electrically connected to said water pump temperature sensor, said control module electrically connected to said engine water temperature sensor, said control module electrically connected to said fresh air intake temperature sensor, said control module electrically connected to said compressor load sensor, said control module electrically connected to said condenser temperature sensor.

15. A cooling system for internal combustion engine comprising:
    a multi-speed water pump connected to an internal combustion engine, said multi-speed water pump in fluid communication with said conventional internal combustion engine, said multi-speed water pump for pumping conventional refrigerant;
    a radiator connected to said multi-speed water pump, said radiator in fluid communication with said multi-speed water pump;
    a first electronic expansion valve connected to said radiator, said electronic expansion valve in fluid communication with said radiator, said electronic expansion valve for metering said conventional refrigerant;
    a fresh air intake cooler connected to said first electronic expansion valve, said fresh air intake cooler in fluid communication with said first electronic expansion valve;
    a second electronic expansion valve connected to said first electronic expansion valve, said second electronic expansion valve in fluid communication with said fresh air intake cooler for providing selective metering of said conventional refrigerant for cooling in said fresh air intake cooler;
    a first check valve connected to said radiator; said first check valve in fluid communication with said radiator; and
    a second check valve connected to said fresh air intake cooler, said second check valve in fluid communication with said fresh air intake cooler, said second check valve connected to said first check valve, said second check valve in fluid communication with said first check valve.

16. The cooling system for internal combustion engine of claim 15 further comprising:
    a filter drier connected to said first electronic expansion valve, said filter drier in fluid communication with said first electronic expansion valve; and
    a heat exchanger connected to said filter drier, said heat exchanger in fluid communication with said filter drier, said heat exchanger connected to said second check valve, said heat exchanger in fluid communication with said second check valve.

17. The cooling system for internal combustion engine of claim 16 further comprising:
    an accumulator connected to said heat exchanger, said accumulator in fluid communication with said heat exchanger; and
    a variable speed compressor connected to said accumulator, said variable speed compressor in fluid communication with said accumulator.

18. The cooling system for internal combustion engine of claim 17 further comprising:
    a liquid receiver connected to said heat exchanger, said liquid receiver in fluid communication with said heat exchanger; and
    a headmaster thermostat valve connected to said liquid receiver, said headmaster thermostat valve in fluid communication with said liquid receiver, said headmaster thermostat valve for selectively metering said conventional refrigerant.

19. The cooling system for internal combustion engine of claim 18 further comprising:
a condenser connected to said headmaster thermostat valve, said condenser in fluid communication with said headmaster thermostat valve, said condenser connected to said variable speed compressor, said condenser in fluid communication with said variable speed compressor.

20. A cooling system for internal combustion engine comprising:
a multi-speed water pump connected to an internal combustion engine, said multi-speed water pump in fluid communication with said conventional internal combustion engine, said multi-speed water pump for pumping conventional refrigerant;
a radiator connected to said multi-speed water pump, said radiator in fluid communication with said multi-speed water pump;
a first electronic expansion valve connected to said radiator, said electronic expansion valve in fluid communication with said radiator, said electronic expansion valve for metering said conventional refrigerant;
a fresh air intake cooler connected to said first electronic expansion valve, said fresh air intake cooler in fluid communication with said first electronic expansion valve;
a second electronic expansion valve connected to said first electronic expansion valve, said second electronic expansion valve in fluid communication with said fresh air intake cooler for providing selective metering of said conventional refrigerant for cooling in said fresh air intake cooler;
a first check valve connected to said radiator; said first check valve in fluid communication with said radiator;
a second check valve connected to said fresh air intake cooler, said second check valve in fluid communication with said fresh air intake cooler, said second check valve connected to said first check valve, said second check valve in fluid communication with said first check valve;
a filter drier connected to said first electronic expansion valve, said filter drier in fluid communication with said first electronic expansion valve;
a heat exchanger connected to said filter drier, said heat exchanger in fluid communication with said filter drier, said heat exchanger connected to said second check valve, said heat exchanger in fluid communication with said second check valve;
an accumulator connected to said heat exchanger, said accumulator in fluid communication with said heat exchanger;
a variable speed compressor connected to said accumulator, said variable speed compressor in fluid communication with said accumulator;
a liquid receiver connected to said heat exchanger, said liquid receiver in fluid communication with said heat exchanger;
a headmaster thermostat valve connected to said liquid receiver, said headmaster thermostat valve in fluid communication with said liquid receiver, said headmaster thermostat valve for selectively metering said conventional refrigerant;
a condenser connected to said headmaster thermostat valve, said condenser in fluid communication with said headmaster thermostat valve, said condenser connected to said variable speed compressor, said condenser in fluid communication with said variable speed compressor;
a water pump temperature sensor connected to said multi-speed water pump;
an engine water temperature sensor connected to said internal combustion engine;
a fresh air intake temperature sensor connected to said fresh air intake cooler;
a compressor load sensor connected to said variable speed compressor;
a condenser temperature sensor connected to said condenser;
a condenser fan in pneumatic communication with said condenser;
a control module electrically connected to said water pump temperature sensor, said control module electrically connected to said engine water temperature sensor, said control module electrically connected to said fresh air intake temperature sensor, said control module electrically connected to said compressor load sensor, said control module electrically connected to said condenser temperature sensor; and
a main power module electrically connected to said control module, said main power module electrically connected to said multi-speed water pump, said main power module electrically connected to said first electronic expansion valve, said main power module electrically connected to said second electronic expansion valve, said main power module electrically connected to said variable speed compressor, said main power module electrically connected to said condenser fan.

\* \* \* \* \*